July 10, 1956  N. J. WILAMOWSKI  2,754,081
COFFEE DISPENSERS

Filed Dec. 7, 1954 2 Sheets-Sheet 1

INVENTOR.
NORBERT J. WILAMOWSKI
BY
Everett G. Wright
ATTORNEY

July 10, 1956     N. J. WILAMOWSKI     2,754,081
COFFEE DISPENSERS
Filed Dec. 7, 1954     2 Sheets-Sheet 2
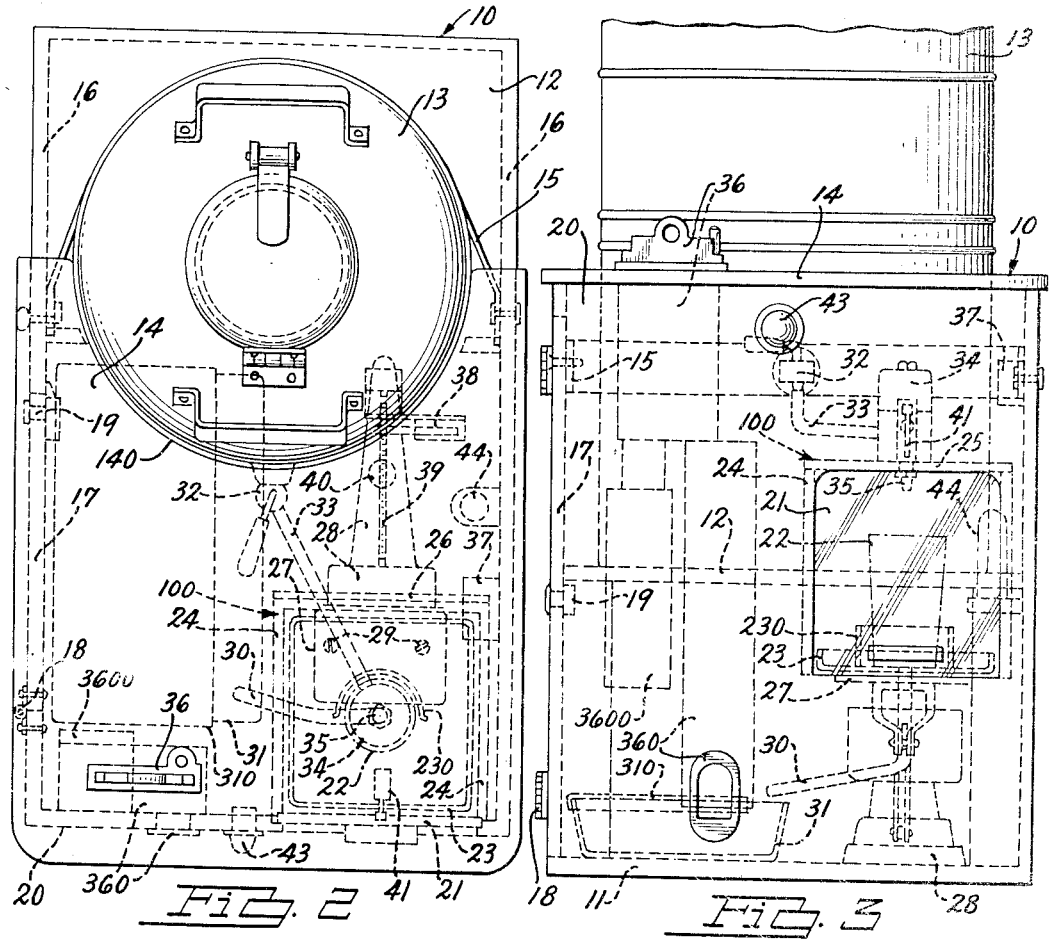
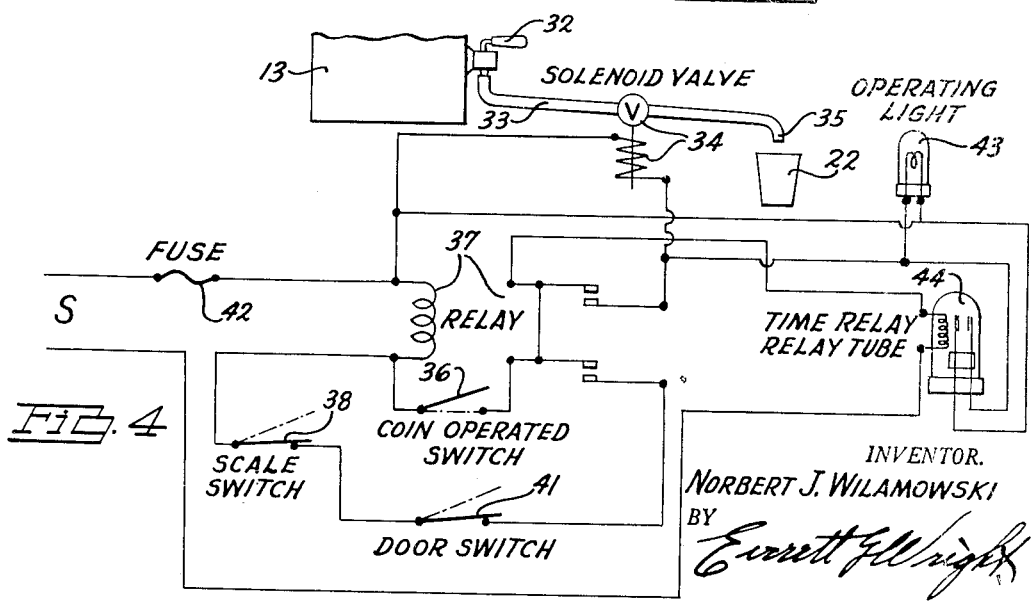
INVENTOR.
NORBERT J. WILAMOWSKI
BY
Everett G. Wright
ATTORNEY _United States Patent Office_

2,754,081
Patented July 10, 1956

2,754,081

COFFEE DISPENSERS

Norbert J. Wilamowski, Hamtramck, Mich., assignor of one-half to Le Roy L. Glidden, Oak Park, Mich.

Application December 7, 1954, Serial No. 473,708

3 Claims. (Cl. 249—62)

This invention relates to improvements in dispensers and in particular to coffee dispensers of the coin operated type.

The primary object of the invention is to provide an improved positive operating coin controlled coffee dispenser that will dispense a predetermined amount of hot coffee from a Thermos container or other reservoir which will complete its cycle of operation if the dispenser is not tampered with, and which will interrupt its cycle of operation if and when the directions to customers are violated.

Another object of the invention is to provide a simply constructed inexpensive coffee dispenser for dispensing hot coffee in disposable cups from a Thermos or other hot coffee reservoir which will require little or no service other than replenishing the supply of hot coffee.

Another object of the invention is to provide a coin controlled coffee dispenser having a normally closed dispensing access door which will not initiate its cycle of operation if the dispensing access door is open, which requires its dispensing access door to be closed during its cycle of operation, and which will interrupt its cycle of operation if the dispensing access door thereto is opened during its cycle of operation.

A further object of the invention is to provide a coffee dispenser which will automatically shut itself off should the vendee fail to place a cup under the dispensing platform or should the vendee attempt to cheat the machine during any normal coin initiated cycle of operation.

Still another object of the invention is to provide an improved and simplified electronic mechanism and circuit for coin operated coffee dispensers of the type that dispenses a predetermined amount of hot coffee into a cup manually placed in the machine on a scale platform under the dispenser nozzle thereof, which circuit incorporates both overflow and anti-tamper features.

Other objects of the invention will become apparent by reference to the following detailed description taken in connection with the accompanying drawings, in which:

Fig. 2 is a top plan view.

Fig. 3 is a front elevational view.

Fig. 4 is a wiring diagram showing the electronic circuit preferably employed.

Figure 1:
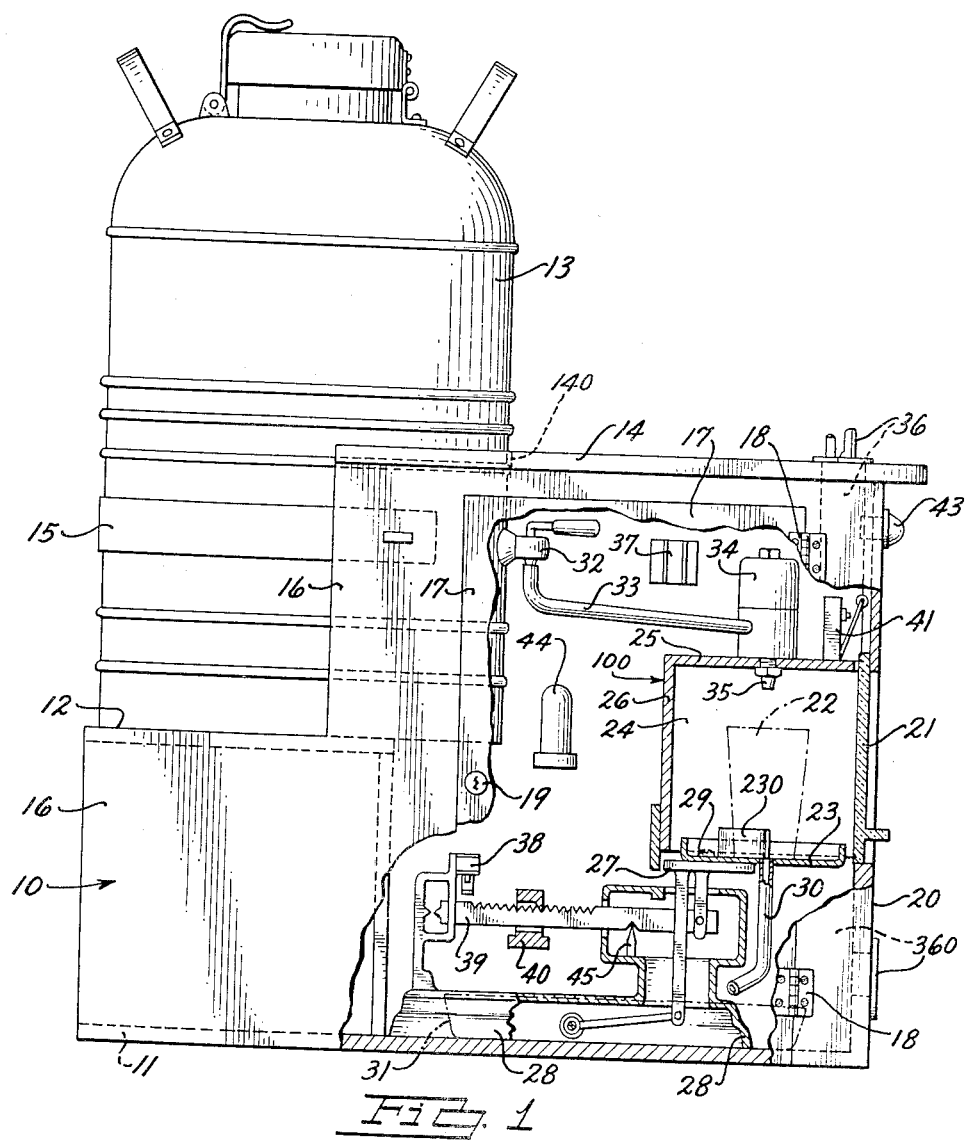
Fig. 1 is a side elevational view of a coffee dispenser embodying the invention with certain portions broken away to show the mechanism thereof.

Referring now to the drawings wherein like reference numerals refer to like and corresponding parts throughout the several views, the coffee dispenser disclosed for the purpose of illustrating the invention is enclosed in a housing 10 which has a platform 12 disposed above the base 11 thereof to support a Thermos type or other hot coffee container 13, the top 14 of the said housing 10 being cut out at 140 to accommodate the said coffee container 13. A band 15 removably connected to the sides 16 of the housing 10 maintains the coffee container in the desired position on the platform 12. One side of the housing 10 has a service door 17, is hinged at 18, and is preferably locked in its closed position by a suitable key controlled lock 19 to prevent unauthorized persons from tampering with the mechanism.

The front 20 of the housing 10 is provided with a vertically sliding transparent plastic or glass dispensing access door 21 through which a paper cup 22 may be placed onto a vending platform 23. The vending platform 23 is provided with an arcuate cup stop 230 to aid the vendee in placing the paper cup 22 in the proper position onto the vending platform 23; however, the mechanism of the dispenser is such that it is not necessary to place the cup 22 precisely in any particular position on the vending platform 23 for the dispenser to function perfectly. Within the housing 10 is a sub-housing 100 which has side panels 24, a top panel 25 and a rear panel 26, the transparent access door 21 and the vending platform 23 serving as the front and bottom panels respectively of the said sub-housing 100. It will be observed that a cup 22 may be placed onto the vending platform 23 and removed therefrom through the access door 21, and at the same time the sub-housing 100 prevents the vendee from having access to or tampering with the dispensing mechanism within the housing 10.

The vending platform 23 is of a dished construction and is supported on the weigh platform 27 of a scale 28, which scale is indicated in Fig. 1 to be of the type that weighs accurately regardless of whether or not the item to be weighed thereon is placed in the center of the weigh platform 27 thereof. The vending platform 23 is secured onto the weigh platform 27 by such suitable means as the machine screws 29. The vending platform 23 is provided with a drain pipe 30 which extends downwardly and laterally to discharge into a spilled coffee receptacle 31 preferably having a cover 310 partially thereover.

When a hot coffee container 13 is delivered to a coffee dispenser embodying the invention, its spigot 32 is connected by a flexible hose 33 to a spring closed solenoid opened dispensing valve 34 mounted on the tap panel 25 of the sub-housing 100, the nozzle 35 of the dispensing valve 34 extending through the said panel 25 directly over the center of the area of the weight platform which is normally occupied by the paper cup 22 during the dispensing cycle of operation of the coffee dispenser.

The solenoid valve 34 is opened by a coin controlled switch 36 operating through a relay 37, and is permitted to return to its spring closed position responsive to the opening of the operating circuit shown in Fig. 4 by means of a scale operated normally closed switch 38 mounted on the scale 28 in a suitable location to be contacted and opened by the scale arm 39 when the cup 22 is filled with a predetermined amount of coffee. The amount of coffee that enters the cup 22 depends upon the setting of the weigh slide 40 on the scale arm 39. To prevent tampering with the dispensing operation of the dispenser, a normally closed anti-tamper micro switch 41 which opens responsive to opening the dispensing access door 21 also opens the operating circuit and permits the spring loaded solenoid valve 34 to return to its closed position during the operating cycle of the dispenser if the dispensing access door 21 is opened by the vendee during the dispensing operation. Also, if the dispensing access door is open at the time a coin is deposited in the coin operated switch 36, the normal dispensing cycle of the coffee dispenser cannot be initiated. An operating light 43 indicates when the coffee dispenser is in operation and serves as a warning to the vendee not to open the dispensing access door 21. The coin operated switch 36 includes the usual coin return 360 and a money box 3600, all of any suitable conventional construction usable for the purpose. Power to operate the coffee dispenser is supplied from a suitable source S protected by a fuse 42.

In the event a vendee places a coin in the coin operated switch 36 to close the operating circuit without first having placed a paper cup 22 on the vending platform 23, coffee spilled during the otherwise normal operating cycle onto the vending platform 23 will drain through the drain pipe 30 into the spilled coffee receptacle 31. A normally closed time relay tube 44 is employed in the operating circuit to open the said operating circuit electronically and shut off the flow of coffee through the dispensing nozzle 35 by permitting the spring loaded solenoid valve 34 to close.

By referring to wiring diagram of Fig. 4 showing the electronic circuit preferably employed, the particular embodiment of a coffee dispenser disclosed and described for the purpose of illustrating the invention is operated and functions as follows. The dispensing access door 21 is manually opened, which opens the anti-tamper switch 41, and a paper cup 22 is placed on the vending platform 23. The access door 21 is then closed which permits the anti-tamper switch 41 to close. The scale operated switch 38 is normally closed. A coin then deposited in the coin operated switch 36 which closes the operating circuit and energizes the spring closed solenoid dispensing valve 34 through the relay 37, and the dispensing cycle of operation of the dispenser is initiated. When the dispensing cycle of operation is thus initiated, the solenoid valve 34 is opened, and coffee is dispensed by gravity flow into the cup 22 from the hot coffee container 13 through the dispensing nozzle 35 of the said solenoid valve 34. The energization of the relay 37 also causes the operating light 43 to become lighted, which remains lit during the flow of coffee into the cup 22. Through the relay 37 current also flows to the heating element of the time relay tube 44, which time relay tube 44 has a time cycle of operation somewhat longer than the interval of time required to dispense a predetermined quantity of coffee into the cup 22.

When a predetermined amount of coffee is dispensed into the cup 22, the scale arm 39 tips about the scale fulcrum 45 and opens the normally closed scale operated switch 38 which opens the operating circuit thereby shutting off current flowing to the solenoid dispensing valve 34, the operating light 43 and the heating element of the time relay 44. The vendee may now open the dispensing access door 21 and remove the cup 22 properly filled with coffee from the vending platform 23. The removal of the filled cup 22 from the vending platform 23 permits the scale operated switch 38 to close, and the vending machine is ready to repeat its normal dispensing cycle.

If a vendee fails to place a cup 22 on the vending platform 23 prior to the initiation of any dispensing cycle, the dispensing cycle is shut off by the opening of the relay circuit responsive to the functioning of the time relay tube 44, which, as hereinbefore indicated, is of the type that operates on a time interval slightly longer than is required to dispense the normal predetermined amount of coffee to fill a cup 22 from the nozzle 35 of the solenoid valve 34. Thus, if a vendee fails to place a cup 22 on the vending platform 23, only a small amount of coffee from the hot coffee container will be lost, the lost coffee draining from the dish-shaped vending platform 23 through the drain pipe 30 into the spilled coffee receptacle 31.

The invention provides an improved and simplified automatic coin controlled coffee vending unit which is not only extremely economical to produce, but which gives a continued substantially trouble free service when placed "on location" in places where a "coffee break" or "coffee-for-lunch" is desired.

Although but a single embodiment of the invention is disclosed and described herein, it is obvious that many changes may be made in the size, shape, arrangement and detail of the various elements of the invention without departing from the spirit and scope thereof as defined by the appended claims.

I claim:

1. In a coffee dispensing apparatus of the gravity flow type, a coffee container, a dished vending platform, a scale supporting said vending platform in an elevated position when empty, said scale including a weigh arm tiltable responsive to the filling of a cup placed on said vending platform with a predetermined amount of coffee, a normally closed solenoid opened dispensing valve disposed in spaced relationship above said vending platform including a connection thereto from said coffee container and a nozzle depending therefrom, coin controlled means energizing said solenoid valve to open the same permitting coffee to flow from the coffee container into said cup, and scale weigh arm operated means de-energizing said solenoid valve permitting said solenoid valve to close and shut off the flow of coffee into a cup placed on said platform responsive to the cup being filled with a predetermined amount of coffee from said nozzle, means through which coffee spilled onto said dished vending platform is drained therefrom, and time controlled means de-energizing said solenoid valve to close the same within a predetermined time after it is energized whereby to prevent wastage of coffee in the event a cup is not placed on the vending platform to receive coffee being dispensed.

2. In a coffee dispensing apparatus of gravity flow type, a housing having an access opening in the front thereof and including an elevated platform, a coffee container on said platform, a sub-housing within said housing having an open bottom and an open front aligned with said access opening in the front wall of said housing, a gravity closed access door normally closing said access opening, a dished vending platform serving as the bottom of said sub-housing, a drain from said vending platform, a scale including a weigh arm supporting said vending platform in an elevated position when empty tiltable responsive to the filling of a cup placed on said vending platform, a normally closed solenoid opened dispensing valve disposed in spaced relationship above said vending platform including a connection thereto from said coffee container and a nozzle depending therefrom, coin controlled means energizing said solenoid valve to open the same permitting coffee to flow from the coffee container into said cup, scale weigh arm operated means de-energizing said solenoid permitting said solenoid valve to close and shut off the flow of coffee to said cup responsive to the cup being filled with a predetermined amount of coffee, time controlled means de-energizing said solenoid valve permitting said valve to close limiting the maximum amount of coffee that may flow through said valve in any one cycle of operation of the dispenser, and means operated by the opening of said access door rendering the dispenser immediately inoperative.

3. In a coffee dispensing apparatus of the gravity flow type, a coffee container, a dished vending platform including means through which coffee spilled thereon is drained therefrom, a housing surrounding said vending platform spaced therefrom, a normally closed access door through which a cup may be placed on said vending platform, a scale supporting said vending platform in an elevated position when empty, said scale including a weigh arm tiltable responsive to the filling of a cup placed on said vending platform with a predetermined amount of coffee, a normally closed solenoid opened dispensing valve disposed in spaced relationship above said vending platform including a circuit from a source of power thereto and a connection thereto from said coffee container and a nozzle depending therefrom, a coin controlled switch means closing said solenoid valve circuit energizing said solenoid valve to open the same permitting coffee to flow from the coffee container into said cup, and scale weigh arm operated switch means opening said solenoid valve circuit de-energizing said solenoid permitting said solenoid valve to close and shut off the flow of coffee to said cup responsive to the cup being filled with a predetermined amount of coffee, and switch means operable responsive to the opening of said access door opening said solenoid valve circuit to permit said solenoid valve to close and prevent the dispensing of coffee while said access door is open, and time controlled means de-energizing said solenoid valve to permit the said solenoid valve to close within a predetermined time after it is initially energized by said coin controlled switch means, said predetermined time being slightly longer than necessary to fill a cup if one had been placed upon said vending platform.

References Cited in the file of this patent

UNITED STATES PATENTS

| | | |
|---|---|---|
| 2,000,556 | Brady | May 7, 1935 |
| 2,050,475 | Sumner | Aug. 11, 1936 |
| 2,613,053 | Dorrington | Oct. 7, 1952 |
| 2,647,719 | Coates | Aug. 4, 1953 |
| 2,698,156 | Bronk | Dec. 28, 1954 |